United States Patent [19]
White

[11] Patent Number: 5,377,818
[45] Date of Patent: Jan. 3, 1995

[54] CONVEYOR BELT SPLICE COVER

[75] Inventor: Richard J. White, Vancouver, Canada

[73] Assignee: Suncor, Inc., Fort McMurray, Canada

[21] Appl. No.: 162,225

[22] Filed: Dec. 6, 1993

[30] Foreign Application Priority Data

Jan. 27, 1993 [CA] Canada ................................ 2088203

[51] Int. Cl.6 ............................................ B65G 15/30
[52] U.S. Cl. .............................. 198/844.2; 24/31 R; 24/31 F; 24/38
[58] Field of Search ................ 198/844.2; 24/31 R, 24/31 B, 31 F, 31 L, 38; 474/253, 254

[56]           References Cited
           U.S. PATENT DOCUMENTS

| 723,379 | 3/1903 | Gilmer | 24/38 |
| 1,996,529 | 4/1935 | Skeyhan | 24/38 |
| 2,056,278 | 10/1936 | Kuhn | 24/38 |
| 2,681,486 | 6/1954 | Carter | 24/38 |
| 2,733,181 | 2/1956 | Paasche | 24/38 |
| 3,487,871 | 1/1970 | Kanamori | 24/38 |

Primary Examiner—Cheryl L. Gastineau
Attorney, Agent, or Firm—Paul Lipsitz

[57]                ABSTRACT

An improved spliced conveyor belt and the method of making it to provide improved impact resistance which comprises laying abutted panels of covering material which contain weft reinforcing strands at a bias angle over the area of the splice so that the reinforcing strands are continuous across the full width of the belt throughout the area of the splice.

10 Claims, 1 Drawing Sheet

CONVEYOR BELT SPLICE COVER

This invention relates to the splicing of conveyor belts which are constructed with reinforcing steel cords or fabric, embedded within the core rubber of the belt. This primary reinforcement is to provide sufficient strength for the belts to meet the required longitudinal operating tensions. This invention pertains specifically to a belt of an improved design and to a method for making vulcanized splices, which have a secondary form of reinforcement to resist the forces of impact.

BACKGROUND OF THE INVENTION

The impact strength of conveyor belts is an important property needed to resist the forces of receiving conveyed material and also to cope with the very high forces produced when material is inadvertently wedged between the belt and a pulley. Ultimately these forces cause splices to fail and belting to be damaged resulting in equipment down time and costly repairs.

The impact strength of conveyor belting can be improved with the inclusion of a reinforcing fabic embedded in the rubber covers. This reinforcing material usually takes the form of a woven fabric produced in lengths sufficient to be continuous along the manufactured length of belt. Splices used to join lengths of conveyor belt can also be reinforced to improve their impact strength.

Problems with the splicing of conveyor belts, particularly with conveyor belts used to transport heavy materials such as tar sands, coal and the like, often arise in the handling and storage of splice covers into which reinforcing material has been installed. In the past, conveyor belts 5 feet or more in width may have splice covers exceeding 10 feet in length, a thickness of about ¾" and can have a weight in the order of 350 pounds. One-piece covers of such size are difficult to manhandle, particularly when laying them out for the splice.

This invention overcomes these difficulties by providing a splice design and a splicing method using a roll of cover material of approximately 1 metre in width, which can be laid on the splice in several places and still provide an improved and consistent impact strength over the whole area of the splice.

DISCUSSION OF THE PRIOR ART

The splicing of conveyor belts is well known in the act and several techniques for splicing ace disclosed. Typical of such disclosures known to applicant are the following four references. None of these disclosures, however, are pertinent to this invention.

U.S. Pat. No. 1,996,529 discloses a belt splice wherein successive plies of sheet material ace cut away at the meeting ends of the belt portions to provide a pair of mating stepped scarfs to provide a structure in which the outer layers or plies of the respective belt portions are depressed below the surface of the belt over an area adjacent their meeting edges to provide a recess to be filled in by reinforcing element.

U.S. Pat. No. 2,056,278 discloses a belt which has as a top layer a piece of bias cut fabric extending over and slightly beyond the splices of inner plies of the belt.

U.S. Pat. No. 3,234,611 discloses a cord construction for a belting joint employing longitudinal overlapping coeds at the joining of the splice.

U.S. Pat. No. 3,487,871 discloses a method of joining the ends of conveyor belts having steel cords or strands embedded therein by the belt ends being joined by removing portions of the belt to expose the strands, placing the exposed strands in grooves of a first rubber plate wherein at least the grooved portion is formed of a semi-vulcanized rubber, applying a second plate in overlying relationship and then bonding the plates one to the other to the belt and to the strands by the application of heat and pressure.

BRIEF DESCRIPTION OF THE INVENTION

The improved conveyor belt splice provided by the invention is accomplished by laying in abutment over the area over which the splice is to be made panels of a splice cover material which contains longitudinal reinforcing strands, (weft strands) underneath and on top of the splice at a bias angle, so that all the reinforcing strands are continuous across the entire width of the belt.

DETAILED DESCRIPTION OF THE INVENTION

The invention is described in more detail with reference to the following drawings.

Figure 1:
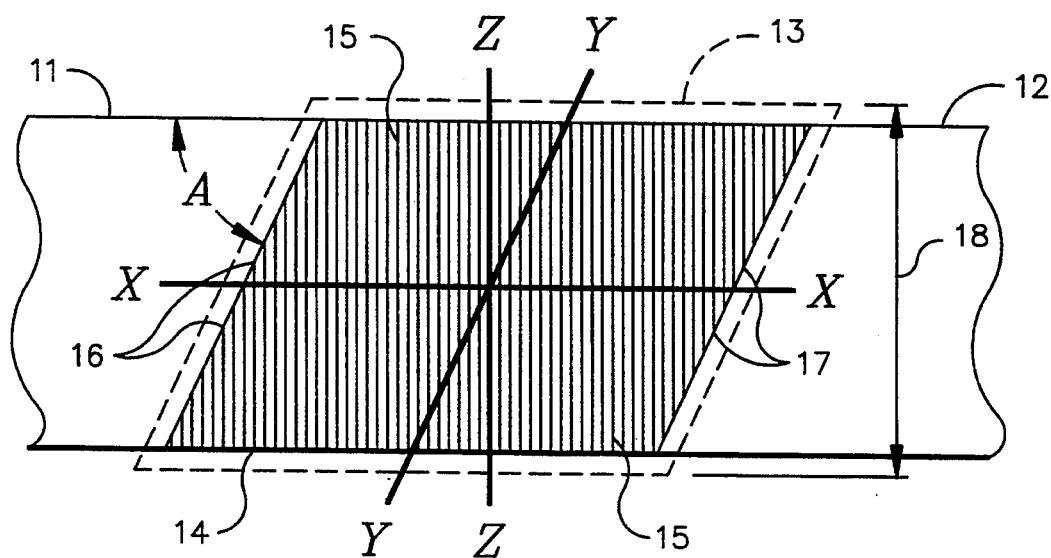
FIG. 1 is a planar drawing showing the conventional method of making a splice with a roll of splice cover containing reinforcing strands of fiber woven into the fabric.

Referring now to FIG. 1, a reinforced splice is used to join conveyor belt (11) to conveyor belt (12) in the conventional manner by laying a one-piece cover panel (13), shown in phantom, having a length and width slightly more than the splice (14). The extra length and width of the cover panel is later trimmed to perfectly fit the splice. The cover panel is made by producing an economic length of uncured rubber, or other elastomeric material which contains a reinforcing woven fabric, with weft strands (15) that run perpendicular to the sides of the roll. Cover panels are laid both underneath and on top of the splice and are trimmed at the bias angle A (an angle dependent on user preference and is usually in the range 45° to 75°), so that the panels fit the area of the splice. To reduce the weight and size of a one-piece reinforced cover panel, there can be a tremendous desire to have it cut into more than one more manageable piece. The cut directions that are possible are indicated by lines X—X, Y—Y and Z—Z. It should be noted, however, that at the leading and trailing edges (16 and 17) of the splice, the reinforcing strands are interrupted, i.e., they are not continuous across the full width of the belt. This lack of continuity would also occur if the separate panels were cut of abutted on lines X—X and Y—Y. In all these cases, the impact strength of the splice is adversely affected because the full diaphragm effect of the splice reinforcing is lost. A cut perpendicular to the direction of belt travel on line Z—Z is well known in the aft to be undesirable, because of an inherent weakness when the belt encounters a pulley of other conveyor components. Joints in belts and splice covers should always be at a bias angle, so edges are progressively led around pulleys. One-piece reinforced splice cover panels need to be made about 12 inches wider than the width of the belt (18) on which they are to be used. Producing these large one-piece panels becomes very difficult or is even impossible for some manufacturers, because of the requirement for large scale equipment, such as calender mills. Also, to manufacture a run of reinforced cover rubber, the fabric has to be pre-woven to facilitate placement.

Figure 2:
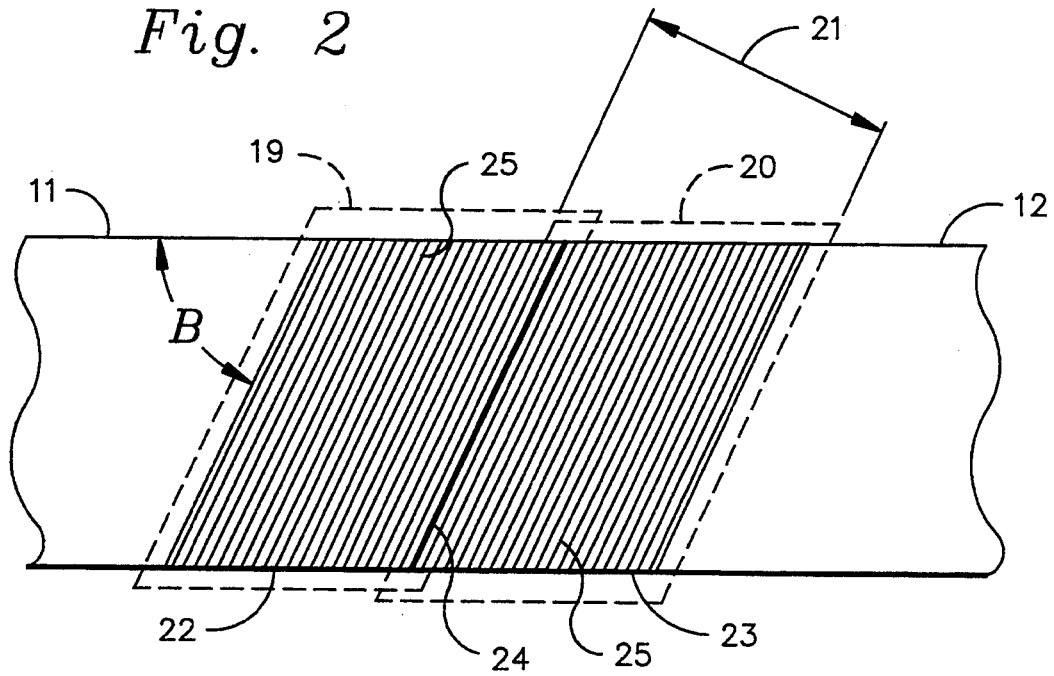
FIG. 2 is a planar view showing how the splice cover is made by the method of the invention.

Referring now to FIG. 2, the conveyor belt is spliced in accord with the invention by using two or more separate pieces of reinforced cover panel. Two cover panels (22) and (23) with excess size (19) and (20), shown in phantom, are cut from a bulk roll of such material. The individual panels are of much smaller size than usual, because they need only be 1 metre, or as required, in width (21). As can be seen from each of the trimmed panels (22) and (23), they are abutted at a bias angle B (of from about 45° to about 75°) at an intermediate point (24) along the splice, yet all reinforcing strands (25) now run continuously across the width of the belt. This method of reinforcing conveyor belt splices results in improved and consistent impact strength over the entire splice area. In addition, since rolls of reinforced splice cover material tend to be limited to about 1 metre in width, manual handling is much more manageable, which also reduces the risk of personal injury. Furthermore, rolls of 1 metre width can be stored in bulk and be available for use for a variety of belt widths and splice sizes. There is additional benefit in the method of the invention in that the invention splice cover employs strands, not a woven fabric, thus eliminating a weaving operation in making the reinforced splice cover used in the invention. Thus, the manufacturer of the splice cover need only feed the fabric strands through a spacing die so that it is sandwiched between the two rubber or other elastomer plies from calendar rolls. This process is known in the art and is usually carried out with steel strands to make steel reinforced rubber belts.

The method of the invention is easily integrated into conventional splicing techniques. The invention provides an improved splicing method and an improved spliced conveyor belt and thus makes a valuable contribution to the art.

I claim:

1. In the method of joining elastomeric conveyor belts by splicing them with panels of a cover material to provide a splice, the improvement which comprises laying panels consisting of an elastomer reinforced solely with weft strands in abutment over the area at which the splice is to be made at a bias angle and in a manner so that said weft strands age continuous across the full width of the belt throughout the area of the splice.

2. The method of claim 1 wherein the bias angle is from about 45° to about 75°.

3. The method of claim 2 wherein the panels of said cover material are about 1 metre in width.

4. The method of claim 2 wherein the cover material is uncured rubber.

5. The method of claim 4 wherein the bias angle is from about 45° to about 75°.

6. The method of claim 1 wherein said elastomer is rubber.

7. A conveyor belt of an elastomer having a splice therein and having improved impact resistance comprising abutted panels of an elastomer covering the area of said splice, said panels being reinforced solely with weft strands and said panels being placed at a bias angle so that said weft reinforcing strands are continuous across the full width of the belt throughout the area of said splice.

8. The spliced conveyor belt of claim 7 wherein the bias angle is between about 45° and about 75°.

9. The conveyor belt of claim 7 wherein the elastomer is rubber.

10. The conveyor belt of claim 7 wherein the elasomer is rubber and the bias angle is between about 45° and about 75°.

* * * * *